No. 755,602. PATENTED MAR. 29, 1904.
C. ANDRESEN.
HOOK AND EYE.
APPLICATION FILED JAN. 6, 1903.
NO MODEL.
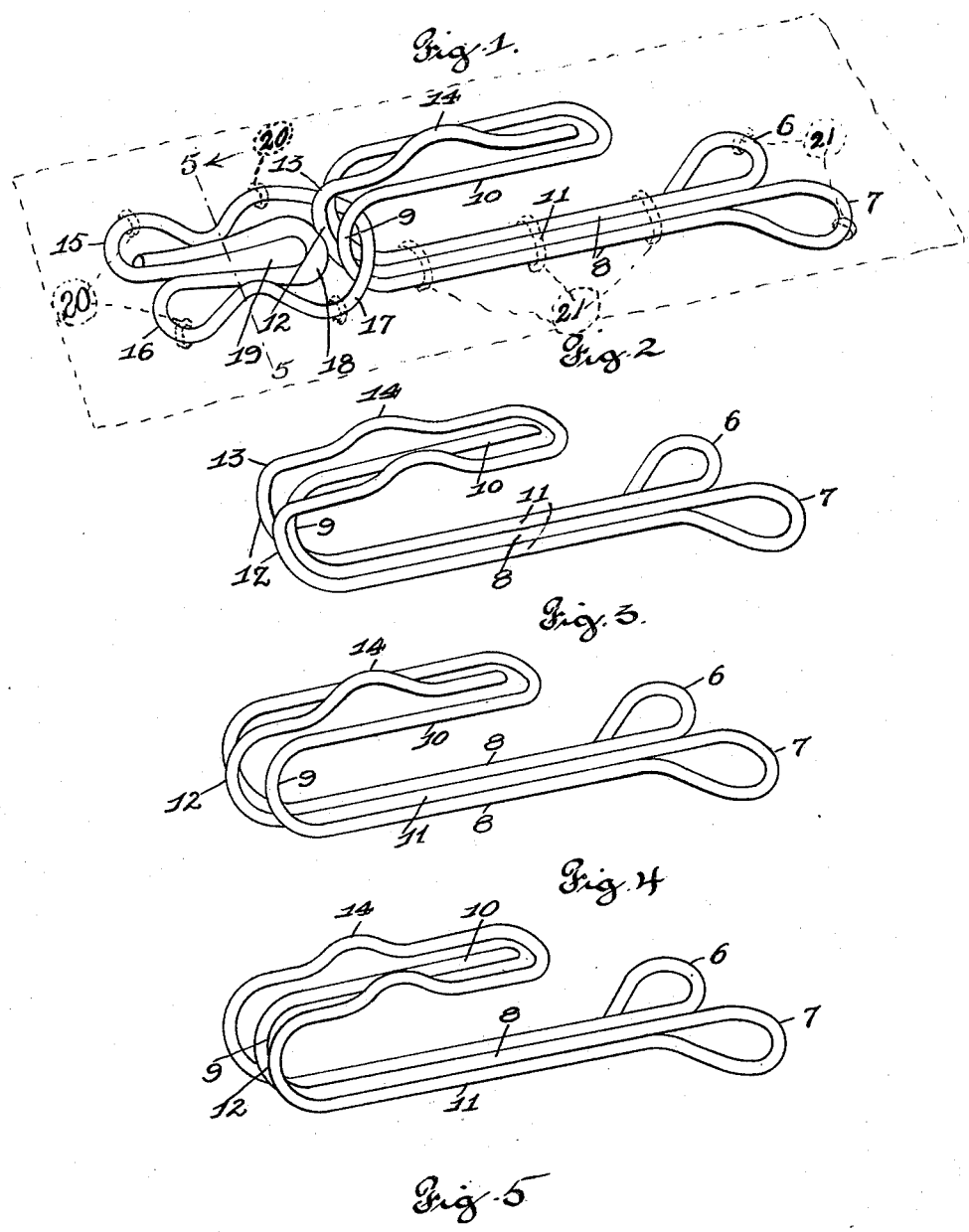

No. 755,602.    Patented March 29, 1904.

UNITED STATES PATENT OFFICE.

CHRISTIAN ANDRESEN, OF ST. LOUIS, MISSOURI, ASSIGNOR TO INTERLOCKING HOOK AND EYE MANUFACTURING COMPANY, OF ST. LOUIS, MISSOURI, A CORPORATION OF MISSOURI.

HOOK AND EYE.

SPECIFICATION forming part of Letters Patent No. 755,602, dated March 29, 1904.

Application filed January 6, 1903. Serial No. 138,078. (No model.)

*To all whom it may concern:*

Be it known that I, CHRISTIAN ANDRESEN, of the city of St. Louis, State of Missouri, have invented certain new and useful Improvements in Hooks and Eyes, of which the following is a full, clear, and exact description, reference being had to the accompanying drawings, forming a part hereof.

My object is to construct an improved hook and eye, said eye having a longitudinally-restricted opening and said hook having a yielding bend-hump and a yielding bill-hump, so that the tension of the humps must be overcome in passing the hook into or out of the eye, the object of the bend-hump being to hold the hook and eye yieldingly in a straight line and the object of the bill-hump being to hold the eye out of engagement with the stitching during the operation of hooking and unhooking and to prevent accidental unhooking when the tension of the bend-hump has been overcome.

My invention consists of an eye and a hook adapted to engage the eye, said hook comprising stitching-loops, a hook member extending from the stitching-loops and consisting of a shank, a bend, and a bill, and a hump member extending from the stitching-loops having an offset outwardly from the hook member at the bend and having a yielding outwardly-projecting bend-hump and having a yielding outwardly-projecting bill-hump, and said eye comprising stitching-loops, an eye-loop connecting the outer ends of the stitching-loops, a restricting-bend extending from the inner end of one of the stitching-loops into the center of the eye-loop, and a fastening-bar extending from the inner end of the other stitching-loop into the restricting-bend.

Figure 1 is a perspective of a hook and eye embodying the principles of my invention. Figs. 2, 3, and 4 show modified forms of the hook. Fig. 5 is a cross-sectional detail of the eye on the line 5 5 of Fig. 1 and looking in the direction indicated by the arrow.

Referring to the drawings in detail, the hook comprises the stitching-loops 6 and 7, the hook member extending from the stitching-loops and forming the shank 8, the bend 9, and the bill 10, and the hump member, extending from the stitching-loops, having the shank portion 11 parallel with the hook member and having the offset 12 outwardly from the bend 9 and having the yielding outwardly-projecting bend-hump 13 at the junction of the bend with the bill and having the yielding outwardly-projecting bill-hump 14 at the bill.

In Fig. 1 the hook member is formed of two outer bars connected at the point of the bill, and the hump member is between the two outer bars. In Fig. 2 the central bar is the hook member and two outer bars form the hump member. In Fig. 3 the construction is identical with Fig. 1, except that the bend-hump 13 is omitted. In Fig. 4 the construction is identical with Fig. 2 with the bend-humps 13 omitted.

The eye comprises the stitching-loops 15 and 16, the eye-loop 17, connecting the outer ends of the stitching-loops, the restricting-bend 18, lying substantially in the plane of the loop 17 and being substantially concentric with the eye-loop, and the fastening-bar 19, running from the inner end of the loop 15 into the bend 18, said bend 18 and the bar 19 being rigidly connected together, thus making the eye-wire practically integral. The restricting-bend 18 and the bar 19 are pressed simultaneously into the form substantially as shown in cross-section in Fig. 5, the sides of the bend 18 pressing against the sides of the bar 19, so as to clamp the bar 19 to the bend.

The shank portion 8 of the hook member 8 9 10 is independent of the shank portion 11 of the hump member 11 12 13 14, thus providing a yielding connection between the hook member and the hump member. The hook member is shorter than the hump member, so as to take the strain of the eye upon the hook member. The bend-hump 13 presents an inclined surface to the point of the restricting-bend 18, the apex of said hump being behind the restricting-bend as required to hold the hook and eye yieldingly in a comparatively straight line, so that if the eye is bent backwardly out of a straight line the tension of the bend-hump 13 must be overcome, and if it is only partly overcome when the pressure is removed the eye will spring forwardly to its normal straight-line position. If the pressure upon the eye is sufficient to overcome the tension of the bend-hump 13, the eye will pass said hump, but still must pass the bill-hump 14 before it is disconnected from the hook. The eye is secured to the garment by stitches 20.

The hook is secured to the garment by stitching 21 passing around the shanks 8 and 11. When the hook is inserted or removed from the eye, the members of the eye scrape along the bill of the hook and are held from scraping along the shanks, thus protecting the stitching.

I claim—

1. A hook and eye, consisting of an eye having a restricted opening; and a hook comprising: stitching-loops; a hook member extending from the stitching-loops and forming a shank, a bend and a bill; a hump member extending from the stitching-loops, and having an offset at the bend, and having a yielding outwardly-projecting bend-hump, and having a yielding outwardly-projecting bill-hump; substantially as specified.

2. A hook and eye, consisting of an eye having a restricted opening; and a hook comprising: stitching-loops; a hook member extending from the stitching-loops and forming a shank, a bend and a bill; a hump member extending from the stitching-loops, and having a yielding outwardly-projecting bend-hump; and having a yielding outwardly-projecting bill-hump; substantially as specified.

3. A hook and eye, consisting of an eye; and a hook comprising stitching-loops; a hook member extending from the stitching-loops and forming a shank, a bend and a bill; a hump member extending from the stitching-loops, and having a yielding outwardly-projecting bill-hump; said eye comprising the stitching-loops 15 and 16; the eye-loop 17 connecting the outer ends of the stitching-loops, the restricting-bend 18 lying substantially in the plane of the loop 17 and being substantially concentric with the eye-loop; and the fastening-bar 19 running from the inner end of the loop 15 into the bend 18, said bend 18 and the bar 19 being rigidly connected together, thus making the eye-wire practically integral; so that when the hook is inserted into the eye, the members of the eye will scrape along the outer and inner surfaces of the bill of the hook, substantially as specified.

4. In a hook and eye, an eye comprising the stitching-loops 15 and 16; the eye-loop 17 connecting the outer ends of the stitching-loops, the restricting-bend 18 lying substantially in the plane of the loop 17 and being substantially concentric with the eye-loop; and the fastening-bar 19 running from the inner end of the loop 15 into the bend 18, said bend 18 and the bar 19 being rigidly connected together, thus making the eye-wire practically integral; so that when the hook is inserted into the eye, the members of the eye will scrape along the outer and inner surfaces of the bill of the hook, substantially as specified.

In testimony whereof I affix my signature in presence of two witnesses.

CHRISTIAN ANDRESEN.

Witnesses:
M. G. IRION,
ALFRED A. EICKS.